(12) United States Patent
Guillard et al.

(10) Patent No.: US 10,288,346 B2
(45) Date of Patent: May 14, 2019

(54) METHOD FOR LIQUEFACTION OF INDUSTRIAL GAS BY INTEGRATION OF METHANOL PLANT AND AIR SEPARATION UNIT

(71) Applicant: L'Air Liquide, Societe Anonyme pour l'Etude et l'Exploitation des Procedes Georges Claude, Paris (FR)

(72) Inventors: Alain Guillard, Houston, TX (US); Michael A. Turney, Houston, TX (US); Alexander Roesch, Katy, TX (US)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 137 days.

(21) Appl. No.: 15/414,118

(22) Filed: Jan. 24, 2017

(65) Prior Publication Data

US 2018/0038641 A1 Feb. 8, 2018

Related U.S. Application Data

(60) Provisional application No. 62/371,497, filed on Aug. 5, 2016.

(51) Int. Cl.
*F25J 1/02* (2006.01)
*B01J 7/02* (2006.01)
(Continued)

(52) U.S. Cl.
CPC .......... *F25J 1/023* (2013.01); *B01D 53/047* (2013.01); *B01J 7/02* (2013.01); *B01J 19/245* (2013.01);
(Continued)

(58) Field of Classification Search
CPC .. F25J 1/00; F25J 1/0022; F25J 1/0032; F25J 1/0035; F25J 1/0037; F25J 1/004;
(Continued)

(56) References Cited

U.S. PATENT DOCUMENTS 2,983,585 A 5/1961 Smith
3,347,055 A 10/1967 Blanchard et al.
(Continued)

FOREIGN PATENT DOCUMENTS

| CN | 103 017 480 | 4/2013 |
|---|---|---|
| CN | 204 063 780 | 12/2014 |

(Continued)

OTHER PUBLICATIONS

Quack, "Conceptual Design of a High Efficiency Large Capacity Hydrogen Liquefier," Adv. Cryog. Eng., Proc. CEC, Madison 2001, AIP, vol. 613, 255-263—Abstract Only.
(Continued)

*Primary Examiner* — Frantz F Jules
*Assistant Examiner* — Erik Mendoza-Wilkenfel
(74) *Attorney, Agent, or Firm* — Justin K. Murray (57) ABSTRACT

A method for the liquefaction of an industrial gas by integration of a methanol plant and an air separation unit (ASU) is provided. The method can include the steps of: (a) providing a pressurized natural gas stream, a pressurized purge gas stream originating from a methanol plant, and a pressurized air gas stream comprising an air gas originating from the ASU; (b) expanding three different pressurized gases to produce three cooled streams, wherein the three different pressurized gases are the pressurized natural gas stream, the pressurized purge gas stream, and the pressurized air gas stream; and (c) liquefying the industrial gas in a liquefaction unit against the three cooled streams to produce a liquefied industrial gas stream. The industrial gas
(Continued)

to be liquefied is selected from the group consisting of a first portion of the pressurized natural gas stream, a nitrogen gas stream, hydrogen and combinations thereof.

19 Claims, 4 Drawing Sheets

(51) Int. Cl.
| | |
|---|---|
| *C07C 31/04* | (2006.01) |
| *F25J 1/00* | (2006.01) |
| *B01D 53/047* | (2006.01) |
| *B01J 19/24* | (2006.01) |
| *C01B 3/34* | (2006.01) |
| *C01B 3/56* | (2006.01) |
| *F25J 3/04* | (2006.01) |

(52) U.S. Cl.
CPC .............. *C01B 3/34* (2013.01); *C01B 3/56* (2013.01); *F25J 1/0022* (2013.01); *F25J 1/0037* (2013.01); *F25J 1/0067* (2013.01); *F25J 1/0072* (2013.01); *F25J 1/0221* (2013.01); *F25J 1/0227* (2013.01); *F25J 1/0229* (2013.01); *F25J 1/0232* (2013.01); *F25J 1/0234* (2013.01); *F25J 1/0297* (2013.01); *F25J 3/046* (2013.01); *F25J 3/04018* (2013.01); *F25J 3/04024* (2013.01); *F25J 3/04121* (2013.01); *F25J 3/04412* (2013.01); *F25J 3/04563* (2013.01); *F25J 3/04593* (2013.01); *B01D 2256/16* (2013.01); *C01B 2203/0216* (2013.01); *C01B 2203/042* (2013.01); *C01B 2203/061* (2013.01); *C01B 2203/127* (2013.01); *C01B 2203/1241* (2013.01); *F25J 2200/06* (2013.01); *F25J 2210/06* (2013.01); *F25J 2210/12* (2013.01); *F25J 2210/40* (2013.01); *F25J 2210/42* (2013.01); *F25J 2210/60* (2013.01); *F25J 2215/40* (2013.01); *F25J 2220/64* (2013.01); *F25J 2220/66* (2013.01); *F25J 2220/68* (2013.01); *F25J 2230/20* (2013.01); *F25J 2230/30* (2013.01); *F25J 2230/40* (2013.01); *F25J 2230/42* (2013.01); *F25J 2240/02* (2013.01); *F25J 2245/40* (2013.01); *F25J 2245/42* (2013.01); *F25J 2260/44* (2013.01); *F25J 2270/04* (2013.01); *F25J 2270/14* (2013.01); *F25J 2270/16* (2013.01); *F25J 2290/12* (2013.01); *F25J 2290/60* (2013.01); *Y02C 10/08* (2013.01); *Y02C 20/20* (2013.01)

(58) Field of Classification Search
CPC  F25J 1/023; F25J 1/0235; F25J 1/0236; F25J 1/0237; F25J 1/0232; F25J 1/0234; F25J 1/0238; F25J 1/0239; F25J 1/0241; F25J 1/0264; F25J 1/0267; F25J 1/0268; F25J 3/0252; F25J 3/0204; F25J 3/0223; F25J 3/0271; F25J 2215/60; F25J 3/0257; F25J 3/04018; F25J 3/0403; F25J 3/04054; F25J 3/0406; C01B 2203/042; C01B 2203/061; C01B 3/56; C01B 3/103; C07C 29/1518

See application file for complete search history.

(56) References Cited

U.S. PATENT DOCUMENTS

| | | | |
|---|---|---|---|
| 3,380,809 A | 4/1968 | Newton | |
| 3,446,747 A | 5/1969 | Bongiorno | |
| 3,501,516 A * | 3/1970 | Parrish | C01B 3/38 252/373 |
| 3,929,438 A | 12/1975 | Harper et al. | |
| 4,185,456 A * | 1/1980 | Cummings | F02C 3/24 252/373 |
| 4,867,773 A * | 9/1989 | Thorogood | F25J 3/04284 62/652 |
| 5,231,835 A | 8/1993 | Beddome et al. | |
| 6,131,407 A | 10/2000 | Wissolik | |
| 6,196,021 B1 | 3/2001 | Wissolik | |
| 6,412,302 B1 | 7/2002 | Foglietta | |
| 6,484,533 B1 | 11/2002 | Allam et al. | |
| 6,694,774 B1 | 2/2004 | Rashad et al. | |
| 7,559,213 B2 | 7/2009 | Allam et al. | |
| 2003/0032844 A1* | 2/2003 | Seiki | C07C 29/1518 568/700 |
| 2003/0191196 A1 | 10/2003 | Madhubhai et al. | |
| 2003/0226373 A1* | 12/2003 | Prible | B63B 27/24 62/612 |
| 2004/0083756 A1* | 5/2004 | Tranier | F25J 1/0022 62/614 |
| 2005/0020434 A1 | 1/2005 | Ansorge et al. | |
| 2006/0260321 A1 | 11/2006 | Minkkinen et al. | |
| 2007/0107465 A1* | 5/2007 | Turner | F25J 1/0022 62/613 |
| 2007/0225384 A1* | 9/2007 | Thiebaut | C01B 3/025 518/705 |
| 2008/0087863 A1 | 4/2008 | Fisciier et al. | |
| 2010/0047160 A1* | 2/2010 | Allam | C01B 3/382 423/651 |
| 2010/0126215 A1* | 5/2010 | Court | F25J 1/0022 62/617 |
| 2010/0150810 A1* | 6/2010 | Yoshida | B01J 8/0411 423/359 |
| 2010/0251763 A1* | 10/2010 | Audun | B63B 25/16 62/614 |
| 2011/0030332 A1* | 2/2011 | Vandor | F01D 15/005 60/39.83 |
| 2011/0301252 A1* | 12/2011 | Ostuni | C07C 29/1518 518/702 |
| 2012/0107227 A1 | 5/2012 | Fischer et al. | |
| 2012/0144837 A1 | 6/2012 | Rasmussen et al. | |
| 2012/0148472 A1* | 6/2012 | Ahmed | C01B 3/025 423/359 |
| 2013/0192297 A1* | 8/2013 | Mak | F25J 1/0022 62/613 |
| 2014/0250911 A1* | 9/2014 | Huntington | F25J 1/0022 60/780 |
| 2014/0352353 A1 | 12/2014 | Wissolik | |
| 2015/0114035 A1* | 4/2015 | Briglia | F25J 5/005 62/620 |
| 2015/0233290 A1 | 8/2015 | Lee et al. | |
| 2016/0216030 A1 | 7/2016 | Truong et al. | |
| 2017/0016668 A1* | 1/2017 | Pierre, Jr. | F25J 3/08 |

FOREIGN PATENT DOCUMENTS

| | | |
|---|---|---|
| JP | 2002 243360 A | 8/2002 |
| JP | 2004 210 597 | 7/2004 |
| WO | WO 00/57118 | 9/2000 |
| WO | WO 2004/065869 | 8/2004 |

OTHER PUBLICATIONS

International Search Report and Written Opinion for PCT/US2017/045524, dated Nov. 10, 2017.
International Search Report and Written Opinion for PCT/US2017/045537, dated Nov. 29, 2017.
International Search Report and Written Opinion for PCT/US2017/045544, dated Dec. 12, 2017.
International Search Report and Written Opinion for PCT/US2017/045549, dated Jan. 18, 2018.
International Search Report and Written Opinion for PCT/US2017/045555, dated Oct. 14, 2017.
Geijsel, J.I., et al, "Synergies Between LNG and Gas to Liquids (56) References Cited

OTHER PUBLICATIONS

Conversion," International Conference and Exhibition on Liquefied Natural Gas, Jan. 1, 2001.
Coulson, et al., "Carbon Capture Optionsfor LNG Liquefaction," 16th International Conference & Exhibition on Liquefied Natural Gas, pp. 1-17, Apr. 2010.
Syed, M.T., et al, "An Economic Analysis of Three Hydrogen Liquefaction Systems," Int. J. Hydrogen Energy, vol. 23, No. 7, pp. 565-576, 1998.
Bracha, M., et al, "Large-Scale Hydrogen Liquefaction in Germany," Int. J. Hydrogen Energy, vol. 19, No. 1, pp. 53-59, 1994.
Ballout, et al., "Comparison of Present Day Peakshaving Liquefaction Technologies," AICHE Spring Meeting, Natural Gas Utilization Conference, vol. 8, Apr. 2008, pp. 30-47.

\* cited by examiner

METHOD FOR LIQUEFACTION OF INDUSTRIAL GAS BY INTEGRATION OF METHANOL PLANT AND AIR SEPARATION UNIT

CROSS REFERENCE TO RELATED APPLICATIONS

This application is a non-provisional application of U.S. Provisional Applicant No. 62/371,497, filed Aug. 5, 2016, which is herein incorporated by reference in its entirety.

TECHNICAL FIELD OF THE INVENTION

The present invention relates to an apparatus and method for liquefaction of an industrial gas stream, where examples of industrial gases are natural gas, nitrogen, methane, ethane, ethylene, and hydrogen. More specifically, embodiments of the present invention are related to liquefying an industrial gas stream by using a combination of refrigeration from pressure letdown of the natural gas, a purge stream originating from a methanol plant, and at least one stream originating from an air separation unit.

BACKGROUND OF THE INVENTION

A methanol plant requires large quantities of natural gas feed from a high pressure transmission network. A portion of this natural gas feed is reduced in pressure through a control valve to low pressure and burned as fuel in the Steam Methane Reformer (SMR), and/or fired heater, and/or gas turbine, auxiliary boiler, steam boiler, and auxiliary burners.

The remaining portion (and majority) of the natural gas feed is processed in desulfurization unit, and reacted in SMR and/or ATR (Autothermal Reformer) to produce a syngas. In a methanol plant the syngas is further compressed to approximately 50-150 bara and reacted to produce methanol and a pressurized byproduct stream that is hydrogen rich. This byproduct stream can be split into two fractions, with the first fraction going to a Pressure Swing Adsorber (PSA) to produce a purified hydrogen product, and the remaining second fraction, also referred to as a purge gas, is reduced in pressure with a control valve to approximately 0.3-7 bara and used as fuel within the methanol plant.

With respect to air separation units (ASU), oxygen and nitrogen are separated from atmospheric air by cryogenic distillation. The required separation energy is provided by a main air compressor (MAC). The oxygen (and possibly nitrogen) product compression is provided by pumping the cryogenic liquid and vaporizing at the required product pressure in the main ASU heat exchanger. The energy required for this product vaporization as well as energy required for liquefied products is provided by a booster air compressor (BAC).

SUMMARY OF THE INVENTION

As noted earlier, the typical methanol process described above includes at least two streams: high pressure natural gas letdown to fuel and hydrogen rich purge as letdown as fuel, which do not utilize the high pressure energy available.

In certain embodiments, the potential high pressure energy of these two streams may be utilized by expansion of the two streams in conjunction with expansion of a third pressurized gas stream originating from an ASU for refrigeration purposes.

In one embodiment, at least a portion of the natural gas and the hydrogen rich purge streams are diverted to an exchanger where they are cooled down, then expanded in turbines to extract energy and produce colder process streams which are then re-warmed in the exchanger to cool the turbine inlet streams as well as the fluid to be liquefied (e.g. natural gas, ethane, methane, nitrogen, hydrogen, ethylene, etc. . . . ).

The third source of refrigeration can be provided by expansion of a pressurized gas stream originating from an ASU such as air from the discharge of the booster air compressor (BAC), pressurized nitrogen from a pipeline or a nitrogen compressor, and combinations thereof. For purposes herein, nitrogen sourced from a pipeline is considered to be a pressurized gas stream originating from an ASU.

In normal operation of an ASU, it is typical for the BAC to not be operating at its maximum design condition. This is because the maximum design conditions are often based on worst case conditions (e.g., maximum liquid products, maximum high pressure gaseous oxygen, summer conditions, etc. . . . ), which may be occasionally required but are rarely an actual operating point. Additionally, the design capacities of the major equipment such as MAC and BAC can be maximized to the limit of a step change in capital cost, for example based on the limit of a compressor frame size. Therefore, in a typical air separation unit, there is often excess capacity available from the BAC, the MAC and pretreatment such that high pressure air can be withdrawn from the ASU at approximately 15-100 bara with some operating cost but with little or zero additional capital cost.

Therefore, certain embodiments of the invention provide for an improved process for liquefaction of an industrial gaseous stream, for example natural gas, that incorporates the available wasted energy of these two processes in an efficient manner.

In one embodiment, a method for the liquefaction of an industrial gas selected from the group consisting of natural gas, nitrogen, hydrogen, and combinations thereof, is provided. In one embodiment, the method can include the steps of: a) withdrawing a pressurized natural gas stream from a natural gas pipeline; b) removing carbon dioxide and water from the pressurized natural gas stream; c) expanding the pressurized natural gas stream to form an expanded natural gas stream and warming the expanded natural gas stream in a first portion of a heat exchanger against the industrial gas to form a warmed natural gas stream; d) sending the warmed natural gas stream to a methanol production facility under conditions effective for producing a methanol stream, a purified hydrogen stream, and a purge gas rich in hydrogen; e) expanding the purge gas rich in hydrogen to form an expanded purge gas and warming the expanded purge gas in a second portion of the heat exchanger against the industrial gas to form a warmed purge gas stream; f) sending the warmed purge gas stream to the methanol production facility for use as fuel; and g) expanding a pressurized air gas stream from or derived from an air separation unit (ASU) to form an expanded air gas stream and warming the expanded air gas stream in a third portion of the heat exchanger against the industrial gas to form a warmed air gas stream, wherein the industrial gas is liquefied during step g). In certain embodiments, the industrial gas may be partially liquefied in steps c) and/or e).

In optional embodiments of the method for the liquefaction of the industrial gas:
the air gas from or derived from an ASU is a gas stream selected from the group consisting of compressed and purified air from a booster air compressor, a nitrogen stream, and combinations thereof, wherein the nitrogen stream is from a source selected from the group consisting of a nitrogen pipeline, a nitrogen compressor in the ASU, and combinations thereof; and/or the industrial gas further comprises trace components having a freezing point temperature warmer than that of methane, wherein the first portion of the heat exchanger and the second portion of the heat exchanger are kept at temperatures warmer than the freezing point temperature of the trace components, and wherein the trace components are removed from the industrial gas prior to the industrial gas being cooled in the third portion of the heat exchanger.

In another embodiment, the method for the liquefaction of the industrial gas can include the steps of: (a) providing a pressurized natural gas stream, a pressurized purge gas stream originating from a methanol plant, and a pressurized air gas stream comprising an air gas originating from an air separation unit (ASU), wherein the pressurized purge gas stream is comprised predominately of hydrogen, wherein the pressurized air gas stream has an oxygen concentration at or below that of atmospheric air; (b) expanding three different pressurized gases to produce three cooled streams, wherein the three different pressurized gases consist of the pressurized natural gas stream, the pressurized purge gas stream, and the pressurized air gas stream; and (c) liquefying the industrial gas in a liquefaction unit against the three cooled streams to produce a liquefied industrial gas stream, wherein the industrial gas to be liquefied is selected from the group consisting of a first portion of the pressurized natural gas stream, a nitrogen gas stream from a nitrogen pipeline, hydrogen, and combinations thereof.

In optional embodiments of the method for the liquefaction of the industrial gas:

the air gas originating from an ASU is a gas stream selected from the group consisting of compressed and purified air from a booster air compressor, a nitrogen stream, and combinations thereof, wherein the air gas from the ASU is at a pressure between 15 to 100 bara, wherein the nitrogen stream is from a source selected from the group consisting of a nitrogen pipeline, a nitrogen compressor in the ASU, and combinations thereof;

the pressurized natural gas stream comprises methane and trace components, wherein the trace components have freezing point temperatures that are warmer than that of methane;

the trace components have freezing point temperatures warmer than about 140° C.;

in steps (b) and (c): the pressurized natural gas stream provides a first portion of cooling to the industrial gas, the pressurized purge gas stream provides a second portion of cooling to the industrial gas, and the pressurized air gas stream provides a third portion of cooling to the industrial gas, wherein the third portion of the cooling is at a temperature that is colder than the first portion of cooling and the second portion of cooling;

the second portion of cooling is provided to the industrial gas in a first heat exchanger, wherein the third portion of cooling is provided to the industrial gas in a second heat exchanger;

the pressurized air gas stream has an oxygen content above the combustibility limit of oxygen in hydrogen;

the pressurized air gas stream has an oxygen content at or below the combustibility limit of oxygen in hydrogen;

the pressurized air gas stream further comprises nitrogen gas from a nitrogen pipeline;

at least a portion of the air gas of the pressurized air gas stream is withdrawn from an outlet of a booster air compressor (BAC) of the ASU;

the flow of air gas withdrawn from the outlet of the BAC and provided in step (a) accounts for less than about 20% of the total volumetric flow of air coming from the outlet of the BAC;

the flow of air gas withdrawn from the outlet of the BAC and provided in step (a) accounts for less than about 5% of the total volumetric flow of air coming from the outlet of the BAC; and/or the three different expansions in step (b) are performed in at least three separate turbines.

In another embodiment, the method for the liquefaction of the industrial gas can include the steps of: a) withdrawing a pressurized natural gas stream from a natural gas pipeline; b) sending a first portion of the pressurized natural gas stream to a methanol production facility under conditions effective for producing a methanol stream, a purified hydrogen stream, and a purge gas rich in hydrogen; c) providing a first portion of cooling by expanding a second portion of the pressurized natural gas stream; d) providing a second portion of cooling by expanding the purge gas rich in hydrogen; e) providing a third portion of cooling by expanding a first portion of a pressurized air gas stream from or derived from an air separation unit (ASU), wherein the air gas from or derived from an ASU is a gas stream selected from the group consisting of compressed and purified air from a booster air compressor, a nitrogen stream from a nitrogen pipeline, and combinations thereof; f) cooling the industrial gas in a heat exchanger using the first portion of cooling and the second portion of cooling; and g) further cooling and liquefying the industrial gas in the heat exchanger using the third portion of cooling to produce a liquefied industrial gas.

In optional embodiments of the method for the liquefaction of the industrial gas:

the third portion of cooling is provided at colder temperatures than both the first portion of cooling and the second portion of cooling;

the industrial gas is cooled to a temperature warmer than about −140° C. in step f); and/or the industrial gas is cooled to a temperature between −140° C. to −165° C. in step g).

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, it is proposed to utilize the potential high pressure energy of the two streams in the above-described methanol process: 1) high pressure natural gas letdown to fuel and 2) high pressure hydrogen rich purge gas letdown as fuel. At least a portion of these streams can be diverted to an exchanger where they can be cooled down, then expanded in a turbine to extract energy and produce a colder process stream, which is then re-warmed in the exchanger to cool the turbine inlet streams, as well as the fluid to be liquefied (e.g., natural gas for LNG or nitrogen for LIN). For a chosen turbine discharge temperature, the turbine inlet temperature can be a result of the available pressure ratio across the turbine. Therefore, in certain embodiments, the two diverted streams from the methanol process are not cooled down prior to expansion.

Because the natural gas stream and purge gas streams can contain some trace components such as, but not limited to ethane, propane, and butane+, there is a low temperature limit for the turbine discharge to prevent liquid formation, which creates process complexities at low levels and turbine damage at high levels. In certain embodiments, this temperature limit can be in the range of about −100° C. depending on composition and pressure. For purposes herein, about −100° C. includes −100° C.+/−50° C. Those of ordinary skill in the art will recognize that this lower level temperature limit for the natural gas stream is preferably selected to prevent adverse process conditions (e.g., excess liquid production) coming out of the turbine discharge. In one embodiment, the molar fraction of liquid at the turbine discharge is less than 20%, preferably less than 15%, more preferably less than 10%. In one embodiment, no liquid production is preferred in the discharge of the turbines.

The liquefaction temperature of low pressure natural gas is approximately −160° C.; therefore, an additional refrigerant is included in embodiments of the present invention in order to liquefy the natural gas at temperatures below the lower limit of the natural gas stream. In one embodiment, the additional refrigerant provides refrigeration in the temperature range from about −100° C. to −160° C. In one embodiment, this additional refrigeration can be provided by expansion of nitrogen and/or air from the ASU. As such, the additional refrigeration can be provided by a stream directly from an ASU and/or from a gas stream derived from an ASU (e.g., nitrogen from a pipeline being a gas stream derived from an ASU).

As described above, the pressurized air from the ASU can be available at approximately 15-100 bara and at relatively low cost due to the typical operating range of the ASU and worst case equipment design basis. With integration of the methanol plant, additional savings can be achieved by driving the MAC and BAC using steam turbines using available steam from the methanol plant.

In another embodiment, a portion of the high pressure air that is not sent to the ASU cold box can be mixed with available high pressure nitrogen ($HPN_2$) from a nitrogen pipeline at approximately 15-100 bara. This can result in a low-cost, lean synthetic high pressure air (or impure $N_2$) stream at approximately 15-100 bara to be available for expansion refrigeration in the liquefier. In one embodiment, the air injection may be limited by the combustibility limit of $O_2$ in methane (approx 12%) or $O_2$ in $H_2$ (approx 6%) or by design margin to these limits if there is a potential leak.

Figure 1:
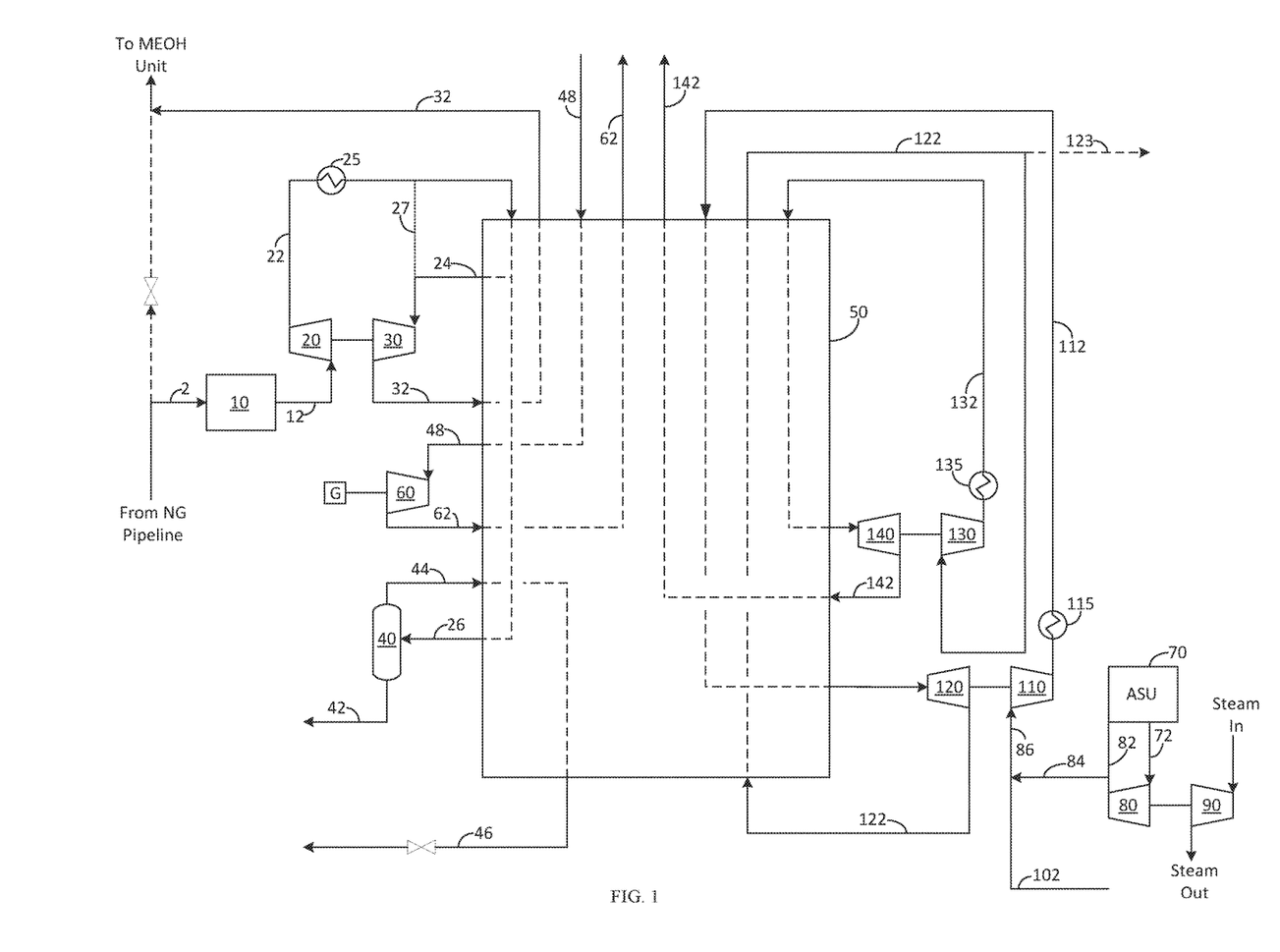
FIG. 1 shows an embodiment of the present invention.

Now turning to FIG. 1. Natural gas 2 is purified of carbon dioxide and water in purification unit 10 to form stream 12 before being compressed in compressor 20 to form pressurized natural gas 22. Pressurized natural gas 22 is then cooled by aftercooler 25 to remove heat of compression from compressor 20.

For the warm end refrigeration (i.e., temperatures warmer than about −100° C.), pressurized natural gas 22 is then cooled within heat exchanger 50, wherein a first portion of the pressurized natural gas 24 is withdrawn at a first intermediate point of the heat exchanger where it is expanded in turbine 30 to low pressure to form first expanded portion 32, before being warmed in heat exchanger 50 and subsequently sent to the methanol plant to be used as fuel (see lines 32 and 308 of FIG. 4). Alternatively, after exiting aftercooler 25, the pressurized natural gas may be sent directly to the inlet of turbine 30 via line 27 rather than cooling the gas in exchanger 50 for the purpose of limiting the temperature at the discharge of the turbine. First expanded portion 32 provides a first portion of the refrigeration used to cool and eventually liquefy the natural gas. The turbine 30 can drive a generator or booster to pre-boost the total NG feed as shown, or only the NG to be liquefied, or only the NG to be expanded, or to post-boost the NG which was expanded.

Figure 3:
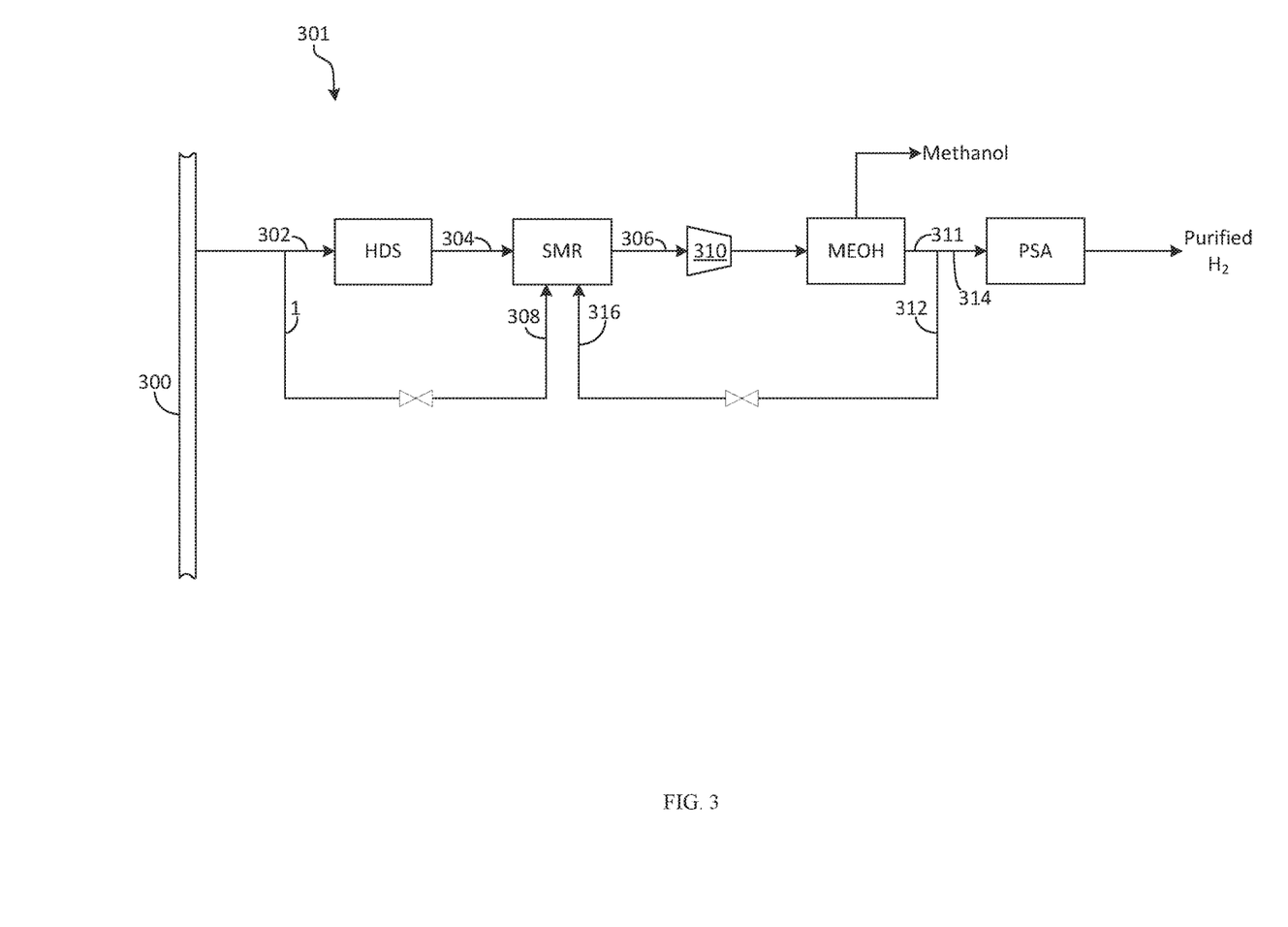
FIG. 3 shows an embodiment of a methanol production facility in accordance with an embodiment of the present invention.

Purge gas 48, which is a high pressure hydrogen rich stream (see 312 of FIG. 3) received from the methanol plant, can be partially cooled (e.g., the purge gas is removed from an intermediate section of the heat exchanger), expanded in second turbine 60 (or set of turbines arranged in series or parallel), which is linked to a generator G, to form expanded purge gas 62 before being warmed in the main exchanger, and sent back to the methanol plant as low pressure fuel (see 316 of FIG. 3). Expanded purge gas 62 provides a second portion of the refrigeration used to cool and eventually liquefy the natural gas.

In another embodiment not shown, after the expanded hydrogen rich purge gas is re-warmed it may be boosted (in a booster which is driven by the expander), re-cooled in the main exchanger, expanded again in a second set of turbines and re-warmed in the main exchanger. This arrangement provides increased refrigeration production by utilizing the higher pressure ratios of the purge gas letdown while at least partially offset by additional cycle complexity and capital cost.

In an optional embodiment, if second portion of the pressurized natural gas 26 (stream to be liquefied as product LNG) contains heavy hydrocarbons such as butane and heavier, it can be withdrawn at a second intermediate point of the heat exchanger and introduced to a liquid/gas separator or distillation column to remove heavy hydrocarbons 42, leaving a top gas 44 that is depleted of heavy hydrocarbons. Top gas 44 is reintroduced into the intermediate and/or cold end of heat exchanger 50, wherein it is further cooled and liquefied to form liquefied natural gas (LNG) 46.

Cold end refrigeration (i.e., temperatures colder than what can be achieved from the purge gas and natural gas expansion or about −100° C. to −140C) can be provided by a boosted air stream 84, a nitrogen stream 102, or a nitrogen-air mixture 86. In the embodiment shown in FIG. 1, nitrogen-air mixture 86 is used. In the embodiment shown, nitrogen-air mixture 86 is at a high pressure (e.g., approximately 15-100 bara) before being boosted by booster 110, cooled in aftercooler 115 to form high pressure air mixture 112, wherein it is partially cooled in heat exchanger 50, expanded in expander 120 to approximately 6 to 8 bara to form expanded air mixture 122, and then warmed in heat exchanger 50. Expanded air mixture 122 provides a third portion of the refrigeration used to cool and eventually liquefy the natural gas.

In the embodiment shown, expanded air mixture 122, after being warmed in heat exchanger 50, can be boosted in booster 130, cooled in aftercooler 135 to form second boosted air mixture 132, before being partially cooled, expanded in turbine 140 to form second expanded air mixture 142, and then re-warmed thereby providing additional refrigeration and then vented to the atmosphere, used as a dry gas to an evaporative cooling system, or for regeneration within a purification unit.

In one embodiment, second boosted air mixture 132 is at approximately 8-15 bara, and second expanded air mixture 142 is at approximately 1.1-2.0 bara for venting to atmosphere, used as a dry gas to an evaporative cooling system, or recompressed.

Figure 2:
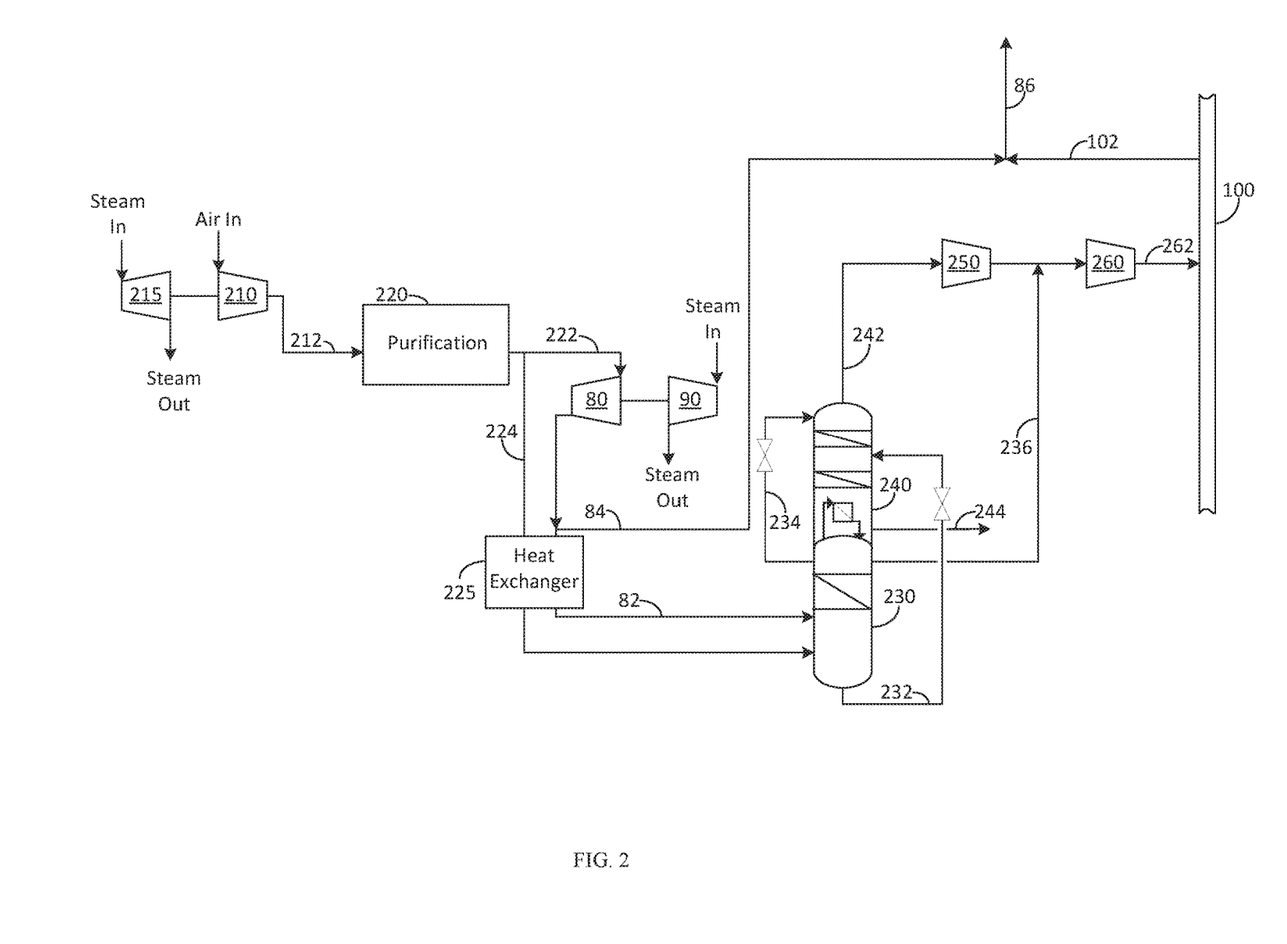
FIG. 2 shows an embodiment of the air separation unit and nitrogen pipeline in accordance with an embodiment of the present invention.

In another embodiment, there may be a requirement for utility nitrogen at a pressure of 5 to 10 bara at the facility, which is typically supplied by the high pressure $N_2$ pipeline 100 of FIG. 2. In this embodiment, the discharge pressure of expander 120 may be adjusted slightly per the customers demand pressure, such that a portion 123 can be removed as product with the remainder available for boosting in booster 130 and then expanded in the second turbine 140.

In another embodiment, heat exchanger 50 may be split into parallel trains such that there is little to no risk of cold refrigerant leaking and being in contact with the hydrogen rich purge gas stream 48. In this embodiment, the oxygen content in the cold refrigerant 86 can be increased to levels which are above that of the combustibility limits of oxygen in hydrogen (approx 6%).

FIG. 2 provides a schematic representation of an air separation unit in accordance with an embodiment of the invention. Air is compressed in main air compressor (MAC) 210, which can be driven by a motor (not shown) or by steam turbine 215, particularly if excess steam is available, to produce compressed air 212. Compressed air 212 is then purified in purification unit 220 to remove components that will freeze at cryogenic temperatures (e.g., carbon dioxide and water). From there, compressed air 212 can be split into a first portion 222 and a second portion 224, wherein second portion 224 can be cooled in ASU heat exchanger 225 and then introduced to the double distillation column. The first portion 222 is further compressed in booster air compressor (BAC) 80 with a first fraction 82 being cooled in the ASU heat exchanger 225 before being introduced into medium pressure column 230. The remaining boosted air stream 84 is sent to the liquefier as described in FIG. 1, either alone or combined with nitrogen stream 102 from nitrogen pipeline 100 (e.g., nitrogen-air mixture 86).

The double distillation column shown is a typical double distillation column in an air separation unit comprising a lower pressure column 240, a shared condenser/reboiler, and the higher pressure column 230 (sometimes also referred to herein as a medium pressure column). A bottoms liquid 232 rich in oxygen is expanded across a valve before being introduced into lower pressure column 240 for further separation. Nitrogen stream 234 is also introduced as reflux. Liquid oxygen stream 244 is produced at a bottom section of lower pressure column 240 as product or vaporized in ASU heat exchanger 225 for gaseous oxygen production. A low pressure nitrogen stream 242 is produced at the top of low pressure column 240, and medium pressure nitrogen stream 236 is produced at a top portion of higher pressure column 230.

In one embodiment, low pressure nitrogen stream 242 can be further compressed by compressor 250 and combined with medium pressure nitrogen stream 236, and then compressed by compressor 260 to form high pressure nitrogen 262, which can then be introduced to nitrogen pipeline 100. Alternatively, a portion of high pressure nitrogen 262 can be sent directly to the liquefier of FIG. 1 without first going to nitrogen pipeline 100.

FIG. 3 provides a schematic overview of a methanol plant 301. Natural gas is withdrawn from natural gas pipeline 300, with a first portion of the natural gas 302 being sent to a hydro-desulfurization unit to remove sulfur to form a desulfurized natural gas 304. This stream is then sent to a steam methane reformer (SMR) in order to produce syngas 306, which is then pressurized in compressor 310 before being sent to the methanol production facility under conditions effective for producing methanol and a purge gas 311. A first portion of the purge gas 314 is then sent to a pressure swing adsorber (PSA) in order to recover purified hydrogen. In a typical methanol plant, second portion of the purge gas 312, which is at an increased pressure of only nominally less than that of the discharge pressure of compressor 310, is typically expanded across a valve to very low pressure (e.g., about atmospheric pressure) and then sent to the SMR for use as purge gas fuel 316. Similarly, it is typical to supplement this fuel by use of a second portion of the natural gas 1 for use as fuel to the SMR after expansion in a valve via line 308.

Figure 4:
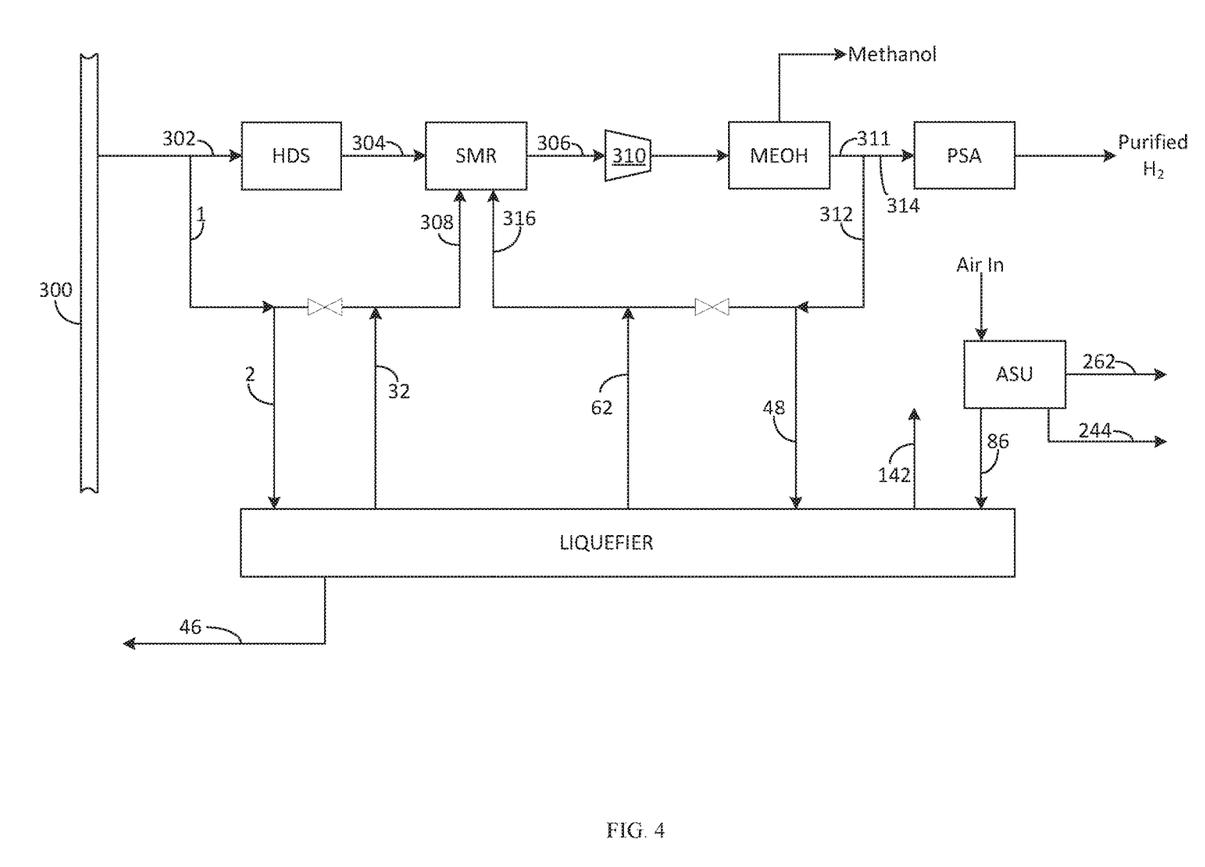
FIG. 4 shows an embodiment of an integrated methanol production facility with an ASU and liquefier in accordance with an embodiment of the present invention.

FIG. 4 provides a schematic overview of an integrated methanol plant, liquefier and ASU in accordance with an embodiment of the present invention. In embodiments of the present invention, instead of wasting the expansion energy of natural gas 1 and second portion of the purge gas 312 by expansion across a valve, natural gas 2 and purge gas 48 are sent to the liquefier, as described in FIG. 1, in order to provide a portion of the refrigeration used to cool and liquefy the natural gas.

Integration of the methanol plant, liquefier, and ASU provides significant energy savings compared to a stand-alone natural gas liquefier. In one embodiment, all of the refrigeration used for liquefaction of the gas stream is provided by the cooling energy provided from the expansion of the natural gas, purge gas and air gas from the ASU (or nitrogen pipeline), thereby providing liquefaction of the natural gas and/or nitrogen gas with minimal additional compression costs. Alternatively, for increased liquefaction, this liquefaction energy can be supplemented by one or more additional liquefaction energy sources such as a cycle compressor driven by electric, gas turbine, or steam turbine drive.

For example, for a production of approximately 344 mtd LNG, embodiments of the invention can produce that amount of LNG for about 190 kW/mt if free steam is available to drive the air compressor and 235 kW/mt if free steam is not available, whereas a stand-alone LNG plant would produce that amount of LNG for about 660 kW/mt. Clearly, even without free steam, embodiments of the invention provide a significant operational savings.

As used herein, "purge gas stream" is process gas to be withdrawn from the pressurized synthesis process to remove impurities and inerts from the catalytic process. The purge gas from methanol plants typically contains between 50-80% hydrogen.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps or devices can be combined into a single step/device.

The singular forms "a", "an", and "the" include plural referents, unless the context clearly dictates otherwise. The terms about/approximately a particular value include that particular value plus or minus 10%, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

We claim:

1. A method for the liquefaction of an industrial gas selected from the group consisting of natural gas, nitrogen, hydrogen and combinations thereof, the method comprising the steps of:
    a) withdrawing a natural gas stream from a natural gas pipeline;
    b) removing carbon dioxide and water from the natural gas stream to produce a purified natural gas stream;
    c) expanding a first portion of the purified a natural gas stream to form an expanded natural gas stream and warming the expanded natural gas stream in a first portion of a heat exchanger against the industrial gas to form a warmed natural gas stream;
    d) sending the warmed natural gas stream to a methanol production facility under conditions effective for producing a methanol stream, a purified hydrogen stream, and a purge gas rich in hydrogen;
    e) expanding the purge gas rich in hydrogen to form an expanded purge gas and warming the expanded purge gas in a second portion of the heat exchanger against the industrial gas to form a warmed purge gas stream;
    f) sending the warmed purge gas stream to the methanol production facility for use as fuel; and
    g) expanding a pressurized air gas stream from or derived from an air separation unit (ASU) to form an expanded air gas stream and warming the expanded air gas stream in a third portion of the heat exchanger against the industrial gas to form a warmed air gas stream,
    wherein the industrial gas is liquefied during step g), wherein the industrial gas comprises a second portion of the purified natural gas stream
    wherein the pressurized air gas from or derived from an ASU is selected from the group consisting of compressed and purified air from a booster air compressor; a nitrogen stream from a source selected from the group consisting of nitrogen pipeline a nitrogen compressor in the ASU, and combinations thereof, and combinations thereof.

2. The method as claimed in claim 1, wherein the industrial gas further comprises trace components having a freezing point temperature warmer than that of methane, wherein the first portion of the heat exchanger and the second portion of the heat exchanger are kept at temperatures warmer than the freezing point temperature of the trace components, and wherein the trace components are removed from the industrial gas prior to the industrial gas being cooled in the third portion of the heat exchanger.

3. A method for the liquefaction of an industrial gas, the method comprising the steps of:
    (a) providing a pressurized natural gas stream, a pressurized purge gas stream originating from a methanol plant, and a pressurized air gas stream comprising an air gas originating from an air separation unit (ASU), wherein the pressurized purge gas stream is comprised predominately of hydrogen, wherein the pressurized air gas stream has an oxygen concentration at or below that of atmospheric air;
    (b) expanding a first portion of the pressurized natural gas stream to produce an expanded natural gas stream, expanding the pressurized purge gas stream to produce an expanded purge gas stream, and expanding the pressurized air gas stream to produce an expanded air gas stream; and (c) liquefying the industrial gas in a liquefaction unit against the expanded natural gas stream, the expanded purge gas stream, and the expanded air gas stream to produce a liquefied industrial gas stream, wherein the industrial gas to be liquefied is selected from the group consisting of a second portion of the pressurized natural gas stream, a nitrogen gas stream from a nitrogen pipeline, hydrogen, and combinations thereof,
    wherein the air gas originating from an ASU is a gas stream selected from the group consisting of compressed and purified air from a booster air compressor; a nitrogen stream from a source selected from the group consisting of a nitrogen pipeline, a nitrogen compressor of the ASU, and combinations thereof; and combinations thereof.

4. The method as claimed in claim 3, wherein the air gas from the ASU is at a pressure between 15 to 100 bara.

5. The method as claimed in claim 3, wherein the pressurized natural gas stream comprises methane and trace components, wherein the trace components have freezing point temperatures that are warmer than that of methane.

6. The method as claimed in claim 5, wherein the trace components have freezing point temperatures warmer than about −140° C.

7. The method as claimed in claim 5, wherein in steps (b) and (c):
    the pressurized natural gas stream provides a first portion of cooling to the industrial gas,
    the pressurized purge gas stream provides a second portion of cooling to the industrial gas, and
    the pressurized air gas stream provides a third portion of cooling to the industrial gas, wherein the third portion of the cooling is at a temperature that is colder than the first portion of cooling and the second portion of cooling.

8. The method as claimed in claim 7, wherein the second portion of cooling is provided to the industrial gas in a first heat exchanger, wherein the third portion of cooling is provided to the industrial gas in a second heat exchanger.

9. The method as claimed in claim 8, wherein the pressurized air gas stream has an oxygen content above the combustibility limit of oxygen in hydrogen.

10. The method as claimed in claim 3, wherein the pressurized air gas stream has an oxygen content at or below the combustibility limit of oxygen in hydrogen.

11. The method as claimed in claim 3, wherein the pressurized air gas stream further comprises nitrogen gas from a nitrogen pipeline.

12. The method as claimed in claim 3, wherein the air gas of the pressurized air gas stream is withdrawn from an outlet of a booster air compressor (BAC) of the ASU.

13. The method as claimed in claim 12, wherein the flow of air gas withdrawn from the outlet of the BAC and provided in step (a) accounts for less than about 20% of the total volumetric flow of air coming from the outlet of the BAC.

14. The method as claimed in claim 12, wherein the flow of air gas withdrawn from the outlet of the BAC and provided in step (a) accounts for less than about 5% of the total volumetric flow of air coming from the outlet of the BAC.

15. The method as claimed in claim 3, wherein the three different expansions in step (b) are performed in at least three separate turbines.

16. A method for the liquefaction of an industrial gas selected from the group consisting of natural gas, nitrogen, hydrogen and combinations thereof, the method comprising the steps of:
   a) withdrawing a natural gas stream from a natural gas pipeline;
   b) sending a first portion of the natural gas stream to a methanol production facility under conditions effective for producing a methanol stream, a purified hydrogen stream, and a purge gas rich in hydrogen;
   c) expanding a second portion of the pressurized natural gas stream to form an expanded natural gas stream;
   d) expanding the purge gas rich in hydrogen to form an expanded hydrogen stream;
   e) expanding a pressurized air gas stream from or derived from an air separation unit (ASU) to form an expanded air gas stream, wherein the air gas from or derived from an ASU is a gas stream selected from the group consisting of compressed and purified air from a booster air compressor (BAC), a nitrogen stream from a nitrogen pipeline, and combinations thereof;
   f) cooling the industrial gas in a heat exchanger against the expanded natural gas stream and the expanded hydrogen stream; and g) further cooling and liquefying the industrial gas in the heat exchanger against the expanded air gas stream to produce a liquefied industrial gas.

17. The method as claimed in claim 16, wherein the third portion of cooling is provided at colder temperatures than both the first portion of cooling and the second portion of cooling.

18. The method as claimed in claim 16, wherein the industrial gas is cooled to a temperature warmer than about −140° C. in step f).

19. The method as claimed in claim 16, wherein the industrial gas is cooled to a temperature between −140° C. to −165° C. in step g).

* * * * *